United States Patent
Contardi et al.

(10) Patent No.: US 8,414,069 B1
(45) Date of Patent: Apr. 9, 2013

(54) VEHICLE LAMP MOUNTING ASSEMBLY

(75) Inventors: Mark Contardi, Farmington, MI (US); Aron Watt, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 12 days.

(21) Appl. No.: 13/298,550

(22) Filed: Nov. 17, 2011

(51) Int. Cl.
*B62D 25/16* (2006.01)
*B60R 19/03* (2006.01)
*B60Q 1/04* (2006.01)

(52) U.S. Cl. ......... 296/198; 293/120; 362/505; 362/507

(58) Field of Classification Search .................. 296/198; 293/120–122; 362/505, 507
See application file for complete search history.

(56) References Cited

U.S. PATENT DOCUMENTS

| 7,540,550 B1 | 6/2009 | Huber et al. |
| 7,644,966 B2 | 1/2010 | Huber et al. |
| 7,798,686 B2 | 9/2010 | Mesko et al. |

FOREIGN PATENT DOCUMENTS

JP 62-034831 A 2/1987

OTHER PUBLICATIONS

Excerpt from The 2009 Nissan Maxima service manual (2 pages).
Excerpt from The 2010 Ford F-150 service manual (1 page).
Excerpt from The 2010 Ford Focus service manual (1 page).
Excerpt from The 2010 Ford Fusion service manual (1 page).
Excerpt from The 2010 Ford Taurus service manual (1 page).
Excerpt from The 2011 Chevrolet Cruze service manual (1 page).
Excerpt from The 2011 Ford Explorer service manual (1 page).

*Primary Examiner* — Dennis Pedder
(74) *Attorney, Agent, or Firm* — Global IP Counselors, LLP

(57) ABSTRACT

A vehicle lamp housing includes a main body, a first projection and a retaining structure. The main body has laterally spaced apart inboard and outboard ends. The first projection extends away from the outboard end, is received in a mounting aperture defined by a body panel and engages a peripheral edge of the mounting aperture. The retaining structure is formed at the inboard end and includes a mounting flange and a second projection that extends away from an underside of the mounting flange. The second projection contacts a mounting surface defined by a bumper fascia retainer that is laterally spaced apart from the body panel and the mounting surface faces away from the vehicle lamp housing such that the first and second projections maintain the vehicle lamp housing in a cantilevered self-supported position when the vehicle lamp housing is installed to the body panel and the bumper fascia retainer.

20 Claims, 12 Drawing Sheets

VEHICLE LAMP MOUNTING ASSEMBLY

BACKGROUND

1. Field of the Invention

The present invention generally relates to a vehicle lamp mounting assembly. More specifically, the present invention relates to a vehicle lamp mounting assembly that is configured to engage a vehicle fender assembly and a front end module to retain a main body of the vehicle lamp in a self-supported position to the fender assembly and the front end module.

2. Background Information

During a vehicle manufacturing process, various preformed components and subassemblies are fitted together and secured to each other. For example, a headlamp assembly can be fitted together with a fender assembly, and then the combined headlamp and fender assembly can be fitted together with a front end assembly. In an existing manufacturing process, an operator manually secures the headlamp assembly to the fender assembly while then attempting to couple the combined fender and headlamp assembly to the front end module. This process can be very cumbersome and tedious. Furthermore, the operator must continue to support the headlamp assembly until the headlamp assembly can be secured to the fender assembly and front end module by bolts or other suitable fasteners. Therefore, the process may require at least one operator to hold the headlamp assembly and another operator to secure the headlamp assembly to the fender assembly and front end module. Also, it is possible for an operator to inadvertently drop the headlamp assembly which can result in damage to the headlamp assembly.

In view of the above, it will be apparent to those skilled in the art from this disclosure that there exists a need for an improved vehicle lamp mounting assembly. This invention addresses this need in the art as well as other needs, which will become apparent to those skilled in the art from this disclosure.

SUMMARY

Accordingly, in view of the state of the known technology, one aspect of the present invention is to provide an exterior vehicle lamp housing comprising a main body, a first projection and a retaining structure. The main body has an inboard end and an outboard end that are laterally spaced apart from one another. The first projection extends away from the outboard end of the main body and is configured to be received in a mounting aperture defined by a body panel such that the first projection engages a peripheral edge of the mounting aperture. The retaining structure is formed at the inboard end of the main body and includes a mounting flange that extends away from the main body and a second projection that extends away from an underside of the mounting flange, with the second projection being configured to contact a mounting surface defined by a bumper fascia retainer that is laterally spaced apart from the body panel and with the mounting surface facing away from the exterior vehicle lamp housing such that the first and second projections maintain the exterior vehicle lamp housing in a cantilevered self-supported position when the exterior vehicle lamp housing is installed to both the body panel and the bumper fascia retainer.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Figure 1:
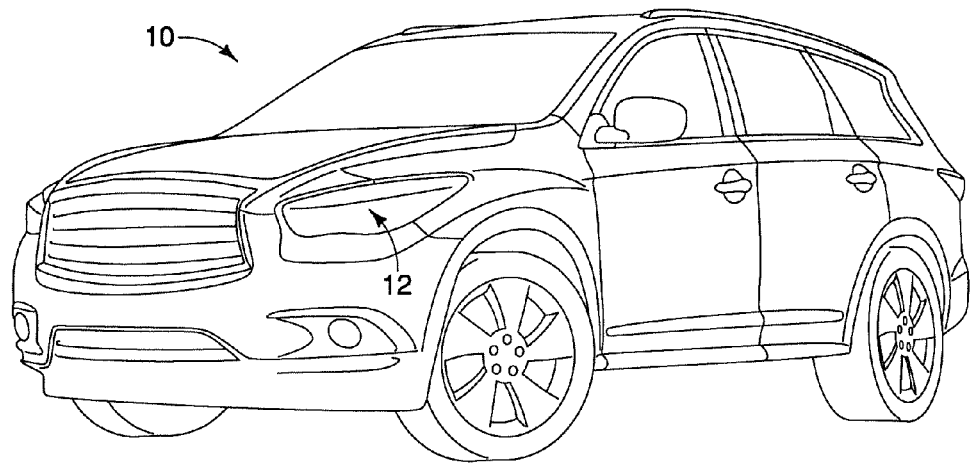
FIG. 1 is a front perspective view of a vehicle equipped with a vehicle lamp mounting assembly in accordance with a disclosed embodiment.
Figure 2:
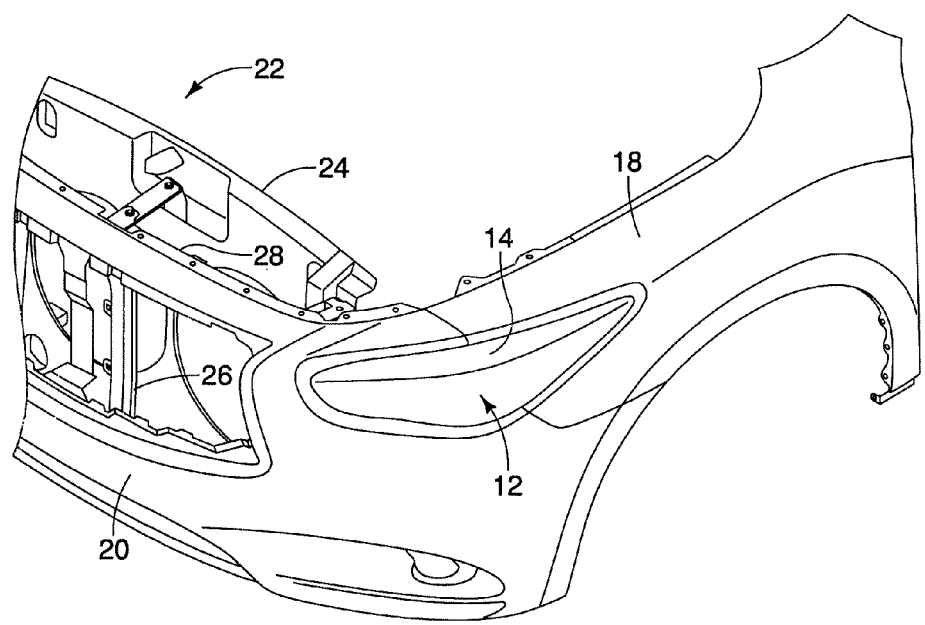
FIG. 2 is a partial front perspective view of selected parts of the vehicle illustrated in FIG. 1 including the vehicle lamp mounting assembly.
Figure 3:
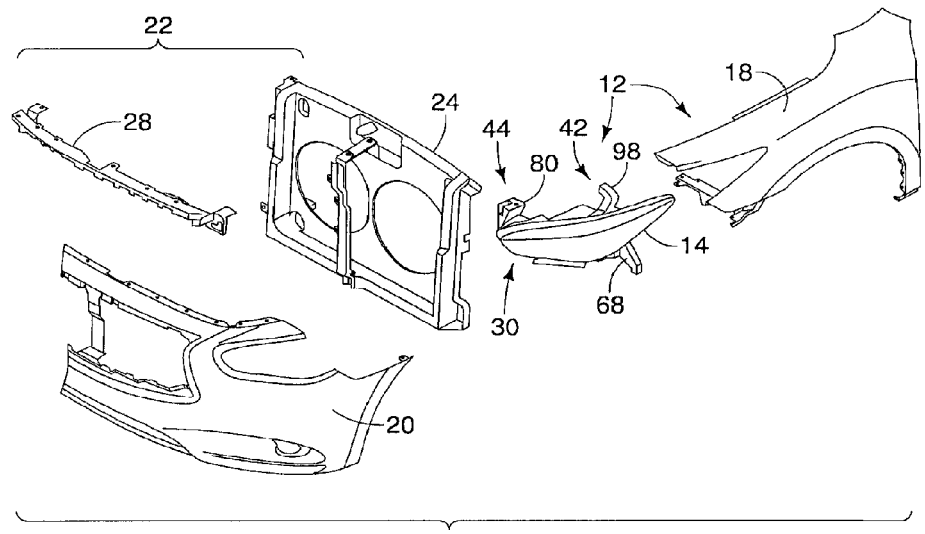
FIG. 3 is an exploded front perspective view of selected parts of the vehicle lamp mounting assembly illustrated in FIGS. 1 and 2.
Figure 4:
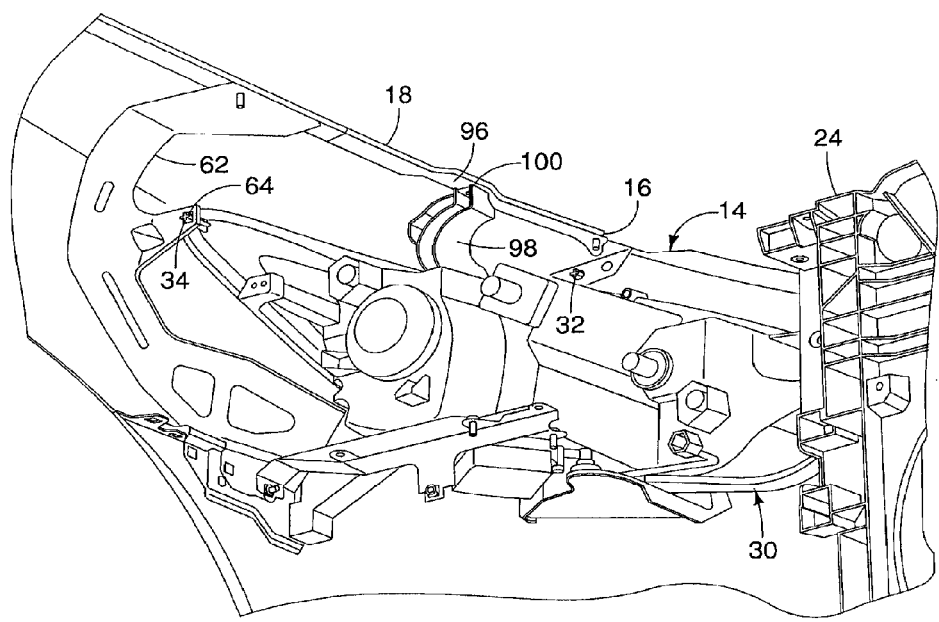
FIG. 4 is a rear perspective view of the vehicle lamp assembly mounted on the vehicle.
Figure 5:
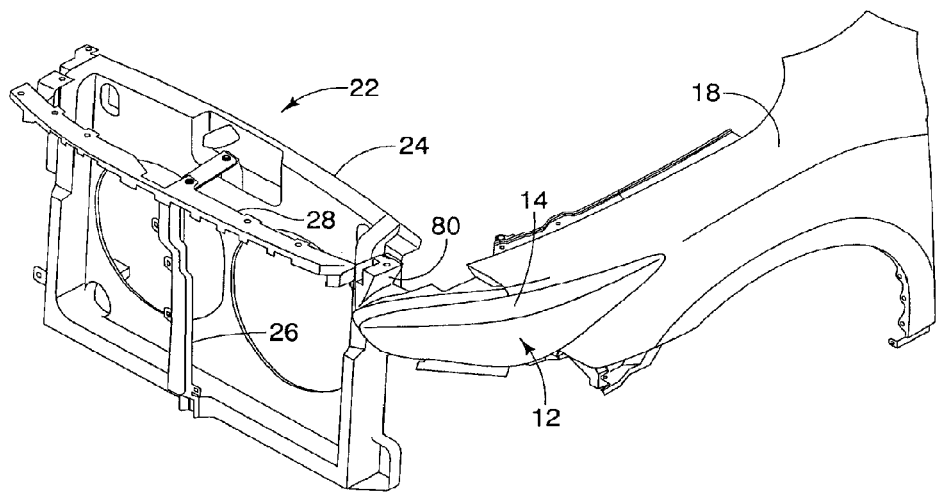
FIG. 5 is another partial front perspective view similar to FIG. 2 with a front bumper fascia removed.
Figure 6:
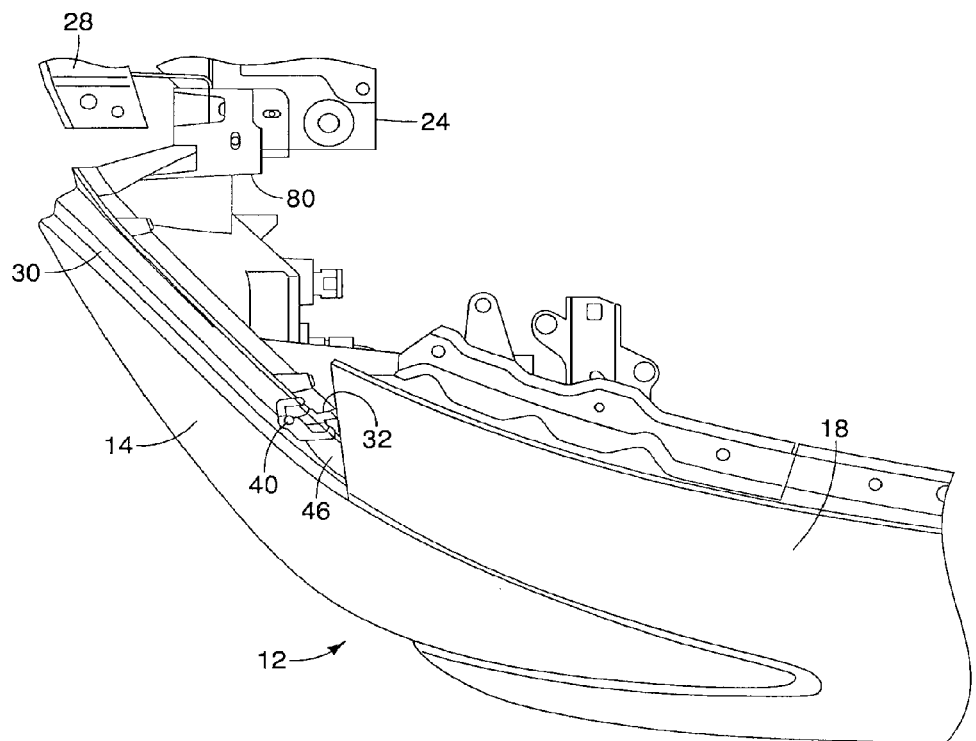
FIG. 6 is a plan view of a front portion of the vehicle showing the vehicle lamp assembly mounted on the vehicle.
Figure 7:
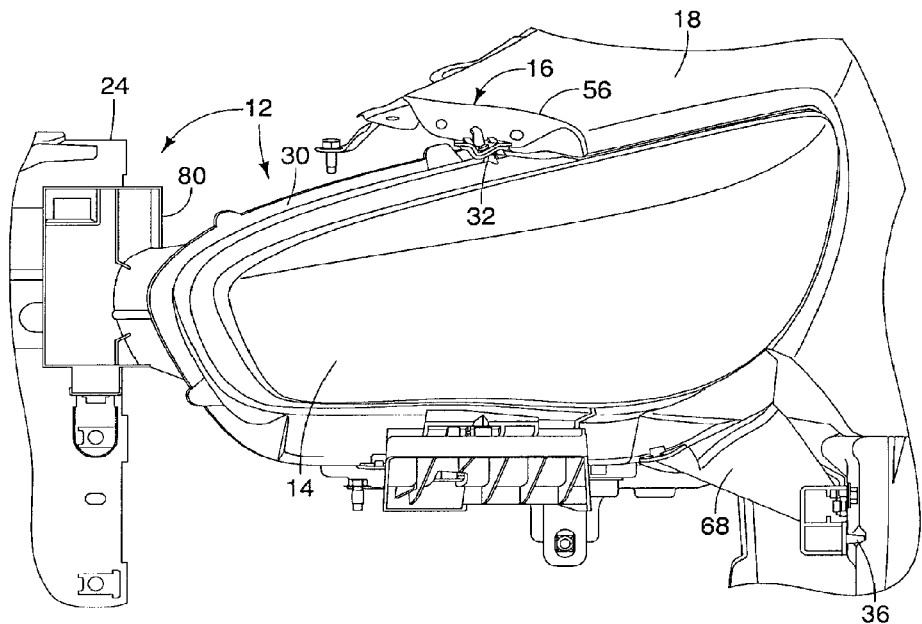
FIG. 7 is a front elevational view of a front portion of the vehicle showing the vehicle lamp assembly mounted on the vehicle.
Figure 8:
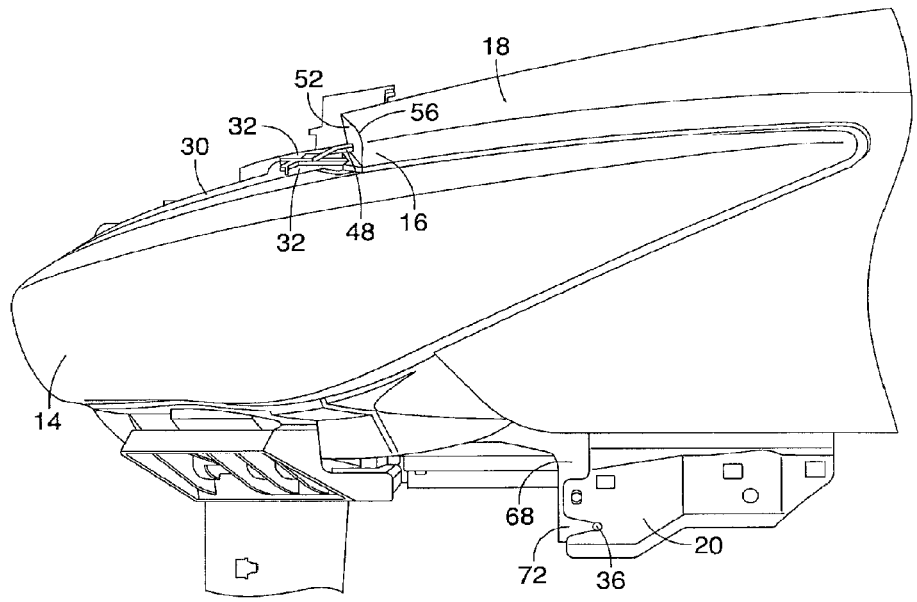
FIG. 8 is a side elevational view of a portion of an outboard side of the vehicle showing the vehicle lamp assembly mounted on the vehicle.
Figure 9:
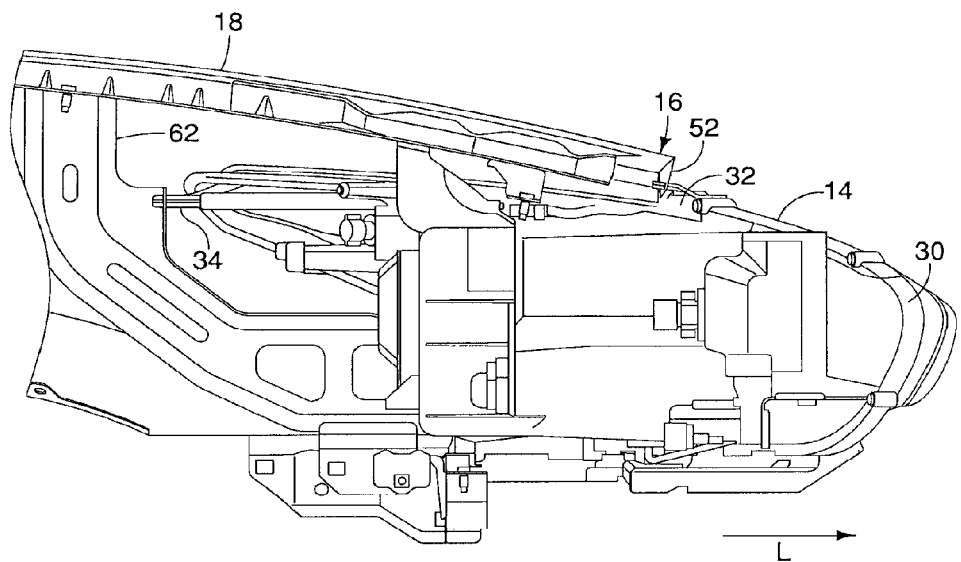
FIG. 9 is a side elevational view of a portion of an inboard side of the vehicle showing the vehicle lamp assembly mounted on the vehicle.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1-9, an automotive vehicle 10 is illustrated with a vehicle lamp mounting assembly 12 in accordance with a disclosed embodiment. The vehicle 10 can be, for example, an SUV, an automobile, a truck, a van or any other suitable vehicle. The vehicle 10 is conventional, except for the vehicle lamp mounting assembly 12 as described herein. Accordingly, the vehicle 10 and its various parts will not be discussed and/or illustrated in detail herein, except as related to the vehicle lamp mounting assembly 12.

The vehicle lamp mounting assembly 12 includes at least a lamp assembly 14 and a fender assembly 16. In this example, the lamp assembly 14 is configured as a front headlamp assembly. The fender assembly 16 includes a fender body panel 18 as discussed in more detail below. An opposite side of the vehicle 10 preferably includes mirror images of the lamp assembly 14 and the fender assembly 16. For the sake of brevity only the left hand (or "driver's side") vehicle lamp mounting assembly 12 will be discussed in detail herein. However, it will be apparent to those skilled in the automotive art from this disclosure that the descriptions and illustrations of the vehicle lamp mounting assembly 12 apply equally to an analogous assembly installed on a right hand (or "front passenger's side") of the vehicle 10. Also, even though the vehicle lamp mounting assembly 12 is illustrated at a front end of the vehicle 10 in this embodiment, it will be apparent to those skilled in the automotive art from this disclosure that the teachings of the present invention can be implemented at a rear end of the vehicle 10 for the rear lamps (or tail lamps) or at any other suitable location on the vehicle 10 alone or in combination as needed and/or desired.

In addition to the vehicle lamp mounting assembly 12 and the fender assembly 16, the vehicle 10 includes a bumper fascia panel 20 and a front end module 22. The bumper fascia panel 20 can be, for example, a one-piece, unitary member formed of a thin, lightweight sheet material such as a rigid plastic material (e.g., a thermoplastic olefin elastomer) or any other suitable material. In any case, the bumper fascia panel 20 should be constructed of a self supporting material with a degree of flexibility such that the bumper fascia panel 20 is flexible yet resiliently maintains its shape. The bumper fascia panel 20 covers a rigid bumper member (not shown).

The front end module 22 includes a support structure 24, a bumper bracket 26 and a bumper fascia retainer 28. The support structure 24, the bumper bracket 26 and the bumper fascia retainer 28 can be made of steel or any other suitable rigid material as understood in the automotive art. The bumper bracket 26 and the bumper fascia retainer 28 are secured to the support structure 24 by screws, bolts or any other suitable type of fasteners. The bumper fascia panel 20 is secured to the front end module 22 via the bumper bracket 26 and the bumper fascia retainer 28 using screws, bolts or any suitable type of fastener. Accordingly, the front end module 22 and, in particular, the bumper bracket 26 and the bumper fascia retainer 28, support the bumper fascia panel 20 as understood in the art.

In addition, any suitable panel flange attachments (not shown) can be used to securely fasten upper parts of the bumper fascia panel 20 to the fender body panel 18, such that the bumper fascia panel 20 mates with the fender body panel 18 to form smooth seams therebetween (i.e., to achieve a high level of fit and finish). The flange attachments can also assist in providing an overall rigid construction at the front end of the vehicle 10.

Figure 10:
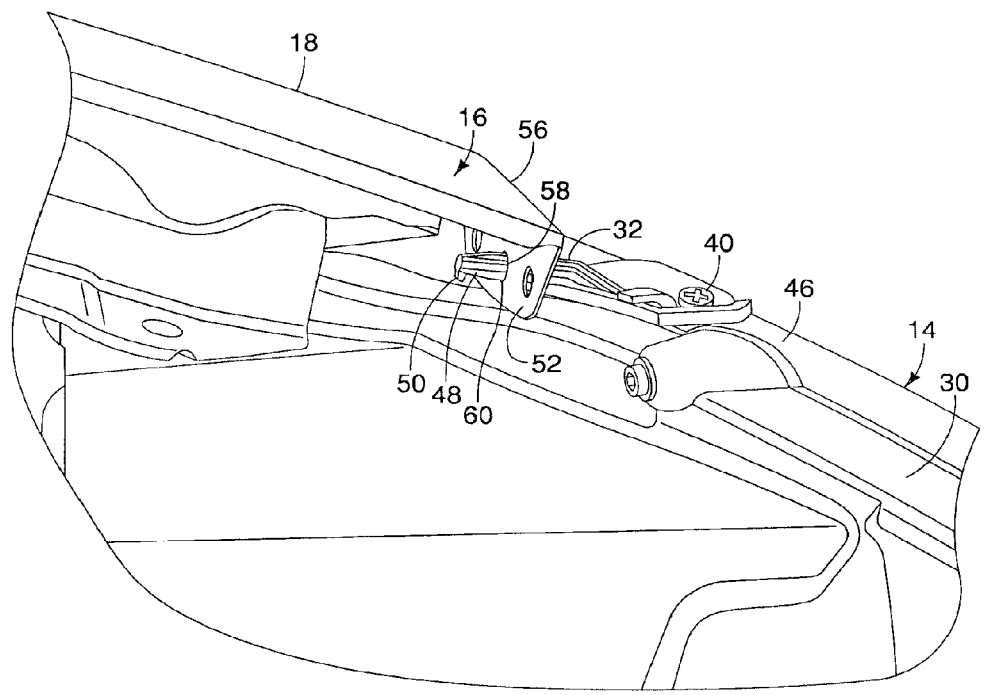
FIG. 10 is a detailed perspective view showing a mounting hook of the vehicle lamp mounting assembly extending through a mounting flange of a fender assembly.
Figure 11:
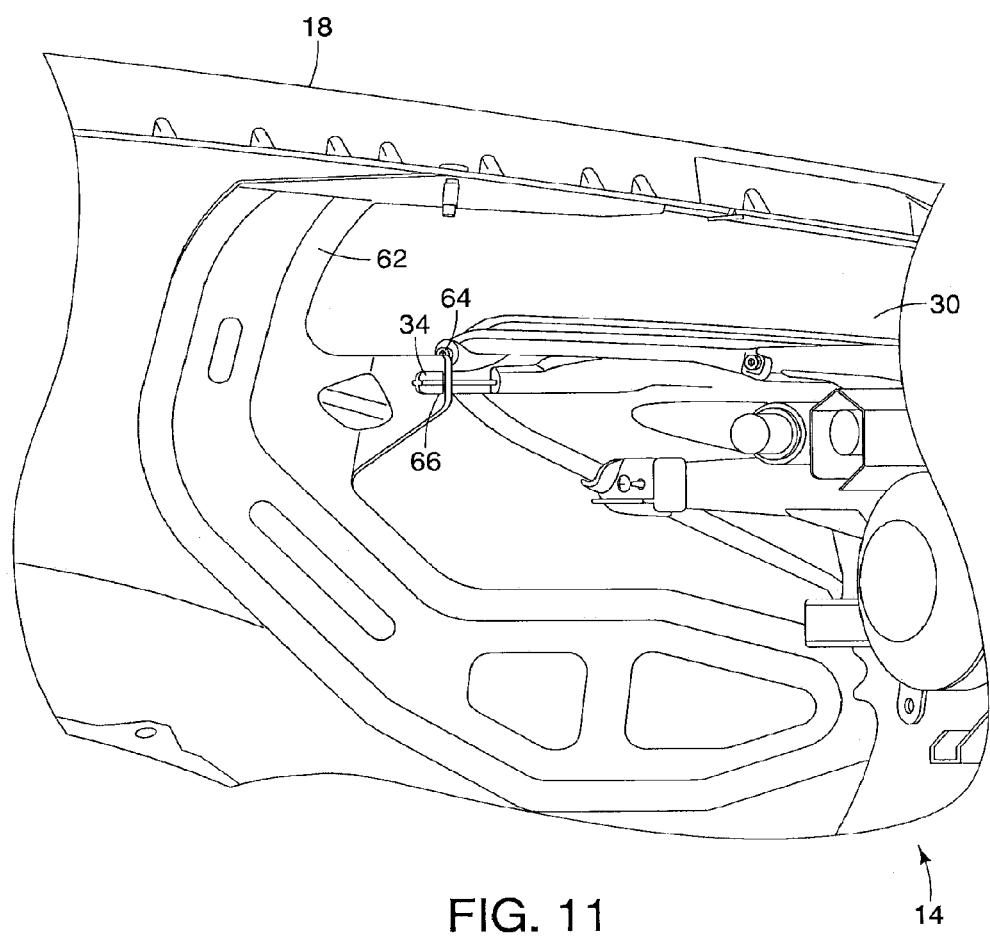
FIG. 11 is a detailed perspective view showing a fender projection of the vehicle lamp mounting assembly extending through a bracket of the fender assembly.
Figure 12:
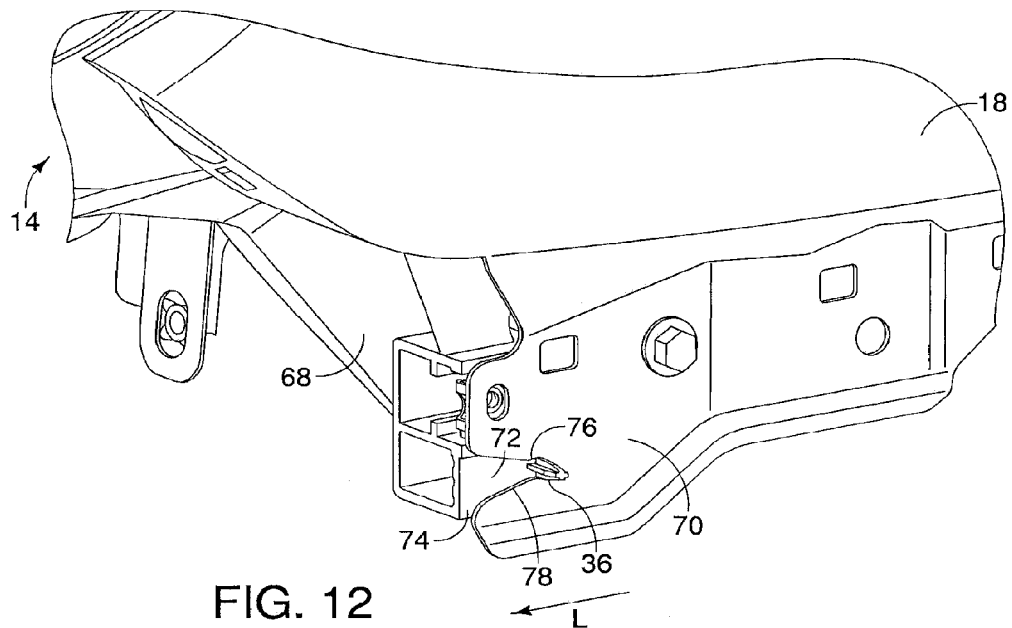
FIG. 12 is a detailed perspective view showing a side projection of the vehicle lamp mounting assembly received within a slot defined by a lower portion of the fender assembly.
Figure 13:
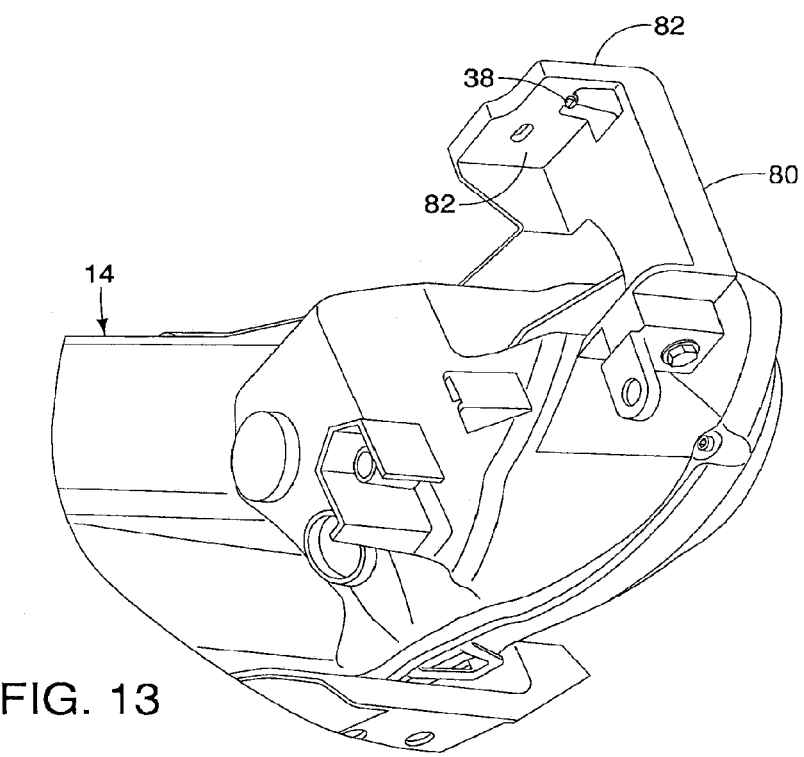
FIG. 13 is an underside perspective view showing a retaining structure of the vehicle lamp assembly.
Figure 14:
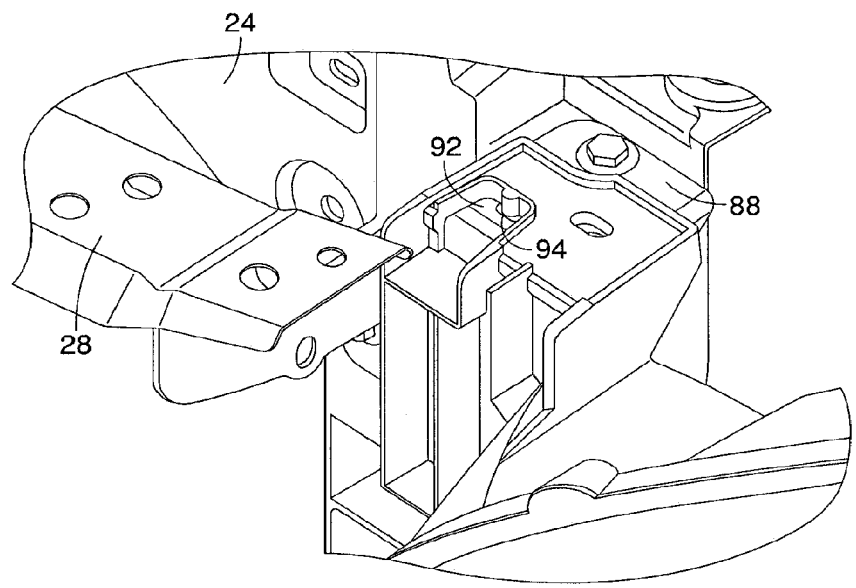
FIG. 14 is an upper perspective view showing the retaining structure of the vehicle lamp assembly engaged with a bumper fascia retainer of the front end module.
Figure 15:
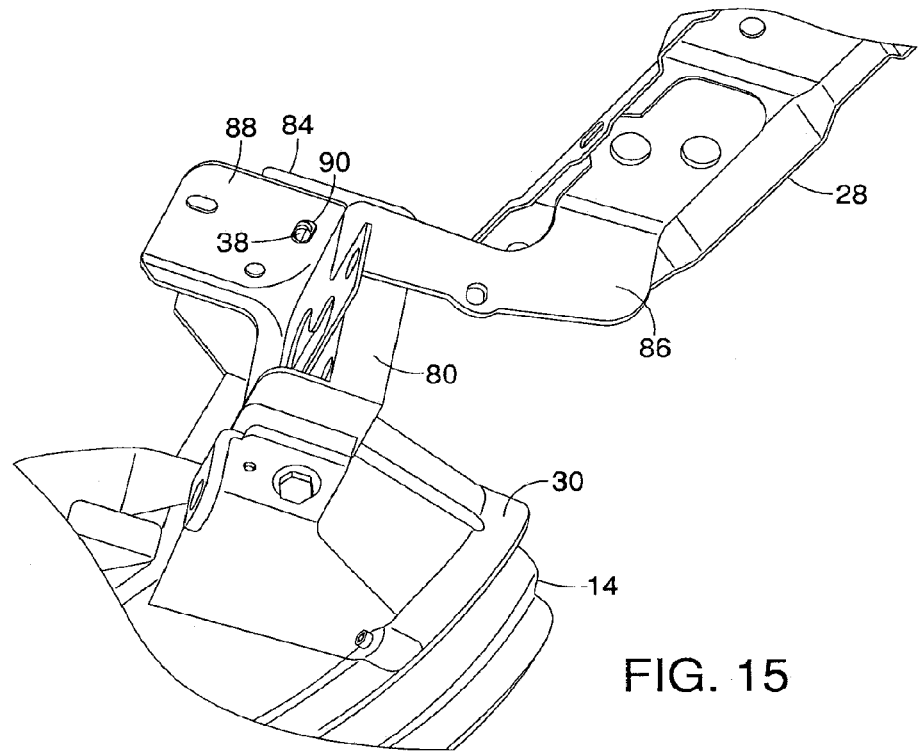
FIG. 15 is a lower perspective view showing the retaining structure of the vehicle lamp assembly engaged with the bumper fascia retainer of the front end module.
Figure 16:
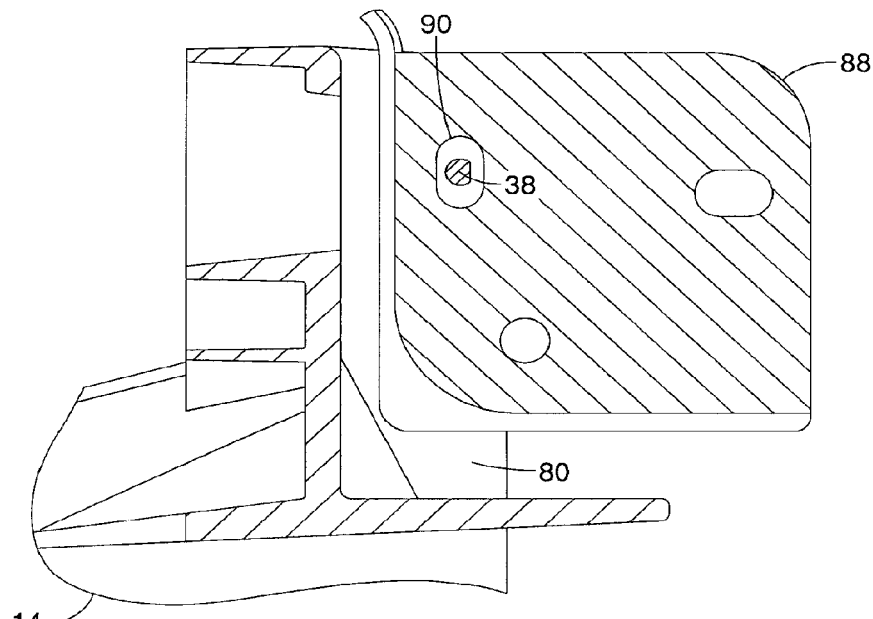
FIG. 16 is a cross-sectional plan view showing the retaining structure of the vehicle lamp assembly engaged with the bumper fascia retainer of the front end module.
Figure 17:
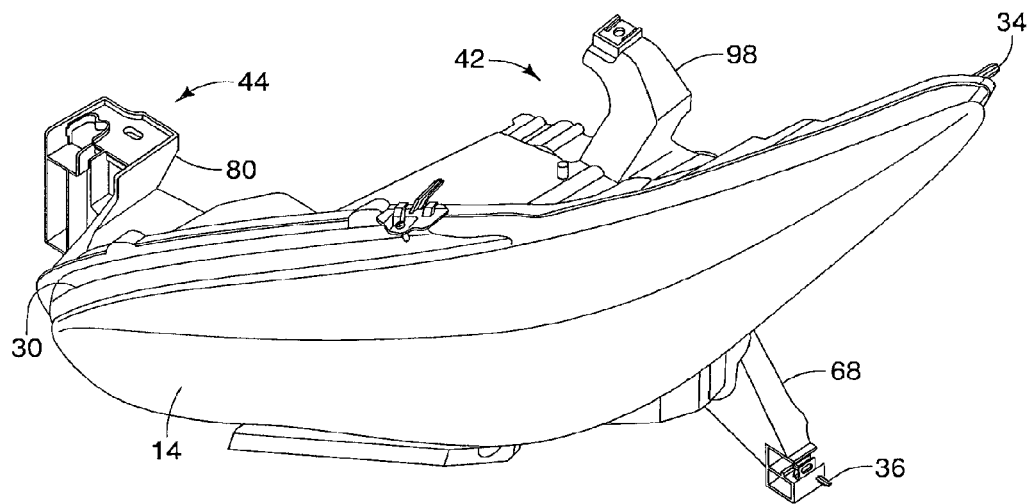
FIG. 17 is a perspective view of the vehicle lamp assembly.
Figure 18:
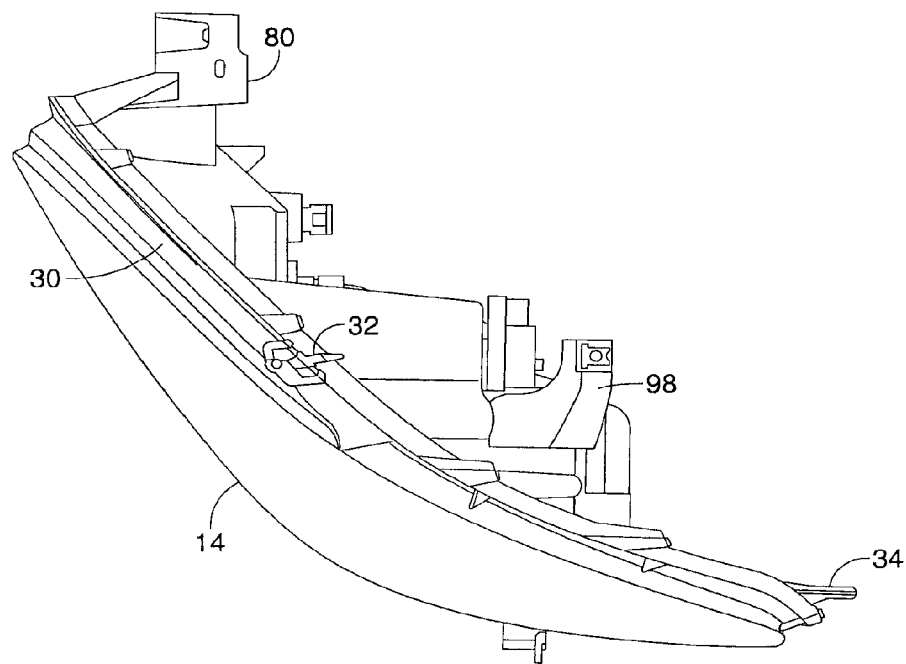
FIG. 18 is a plan view of the vehicle lamp assembly.
Figure 19:
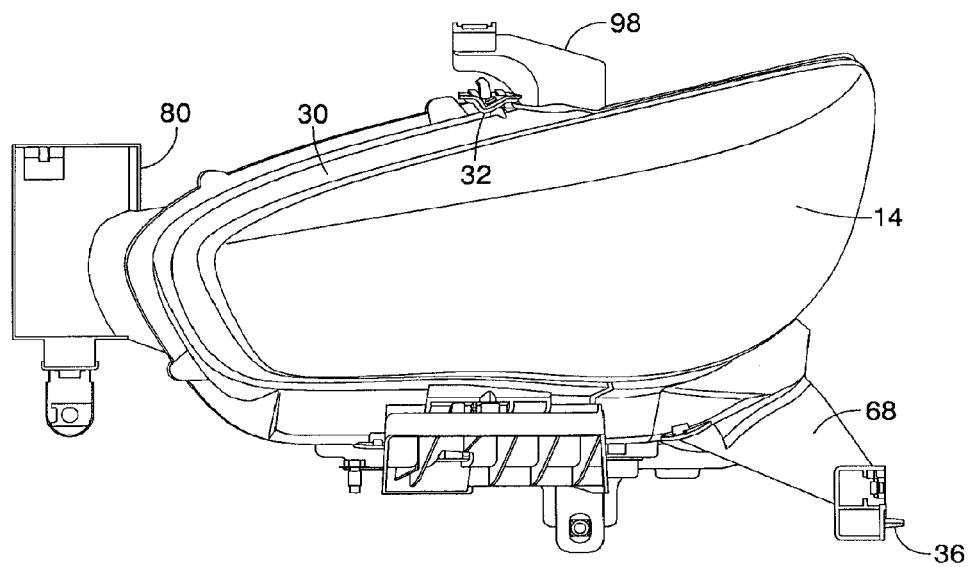
FIG. 19 is a front elevational view of the vehicle lamp assembly.
Figure 20:
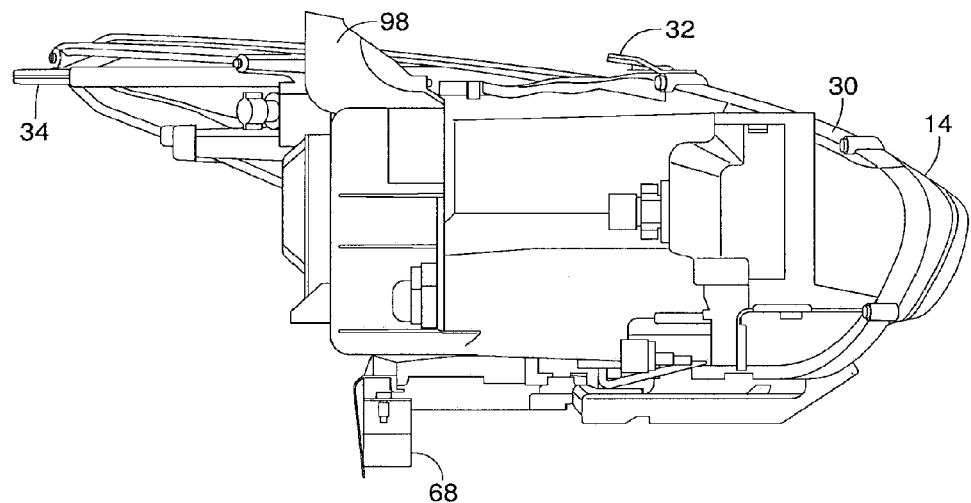
FIG. 20 is an inboard side elevational view of the vehicle lamp assembly.

Further details of the vehicle lamp mounting assembly 12 will now be discussed. As mentioned above, the vehicle lamp mounting assembly 12 includes a lamp assembly 14 and a fender assembly 16 of the vehicle 10. The lamp assembly 14 can include a housing, lens, lamp, and associated electronic components as understood in the art. As shown in more detail in FIGS. 3-20, the housing of the lamp assembly 14 includes a main body 30 and a projection arrangement including a fender projection 34 (or first projection), a side projection 36 and a retaining structure 80. The lamp assembly 14 further includes a mounting hook 32 fixed to an upper portion of the lamp assembly 14. Any of the mounting hook 32, the fender projection 34, the side projection 36 and the retaining structure 80 can be integrally formed with the main body 30 of the lamp assembly 14. Also, any or all of the mounting hook 32, the fender projection 34, the side projection 36 and the retaining structure 80 can be separately attached to the main body 30 using screws, rivets or any other suitable fasteners. For instance, as shown in FIG. 10, the mounting hook 32 is coupled to the main body 30 with a screw 40.

The main body 30 as well as the mounting hook 32, the fender projection 34, the side projection 36 and the retaining structure 80, can be made of hard plastic, polymer or any other suitable materials used in the automotive art. As discussed in more detail below, the lamp assembly 14 is configured to engage the fender assembly 16 and the front end module 22 when the lamp assembly 14 is installed to the vehicle 10. That is, the fender projection 34 and the side projection 36 are positioned at an outboard end 42 of the main body 30 to locate the lamp assembly 14 in a prescribed position and orientation with respect to the fender assembly 16. The retaining structure 80 is positioned at an inboard end 44 of the main body 30. The outboard and inboard ends 42 and 44 are spaced laterally from each other. The fender projection 34, the side projection 36 and the retaining structure 80 cooperate to retain the lamp assembly 14 in a cantilevered self-supported position during installation of the lamp assembly 14 to the vehicle 10.

In this example, the mounting hook 32 is fixed to an upper front portion 46 of the lamp assembly 14 between the inboard and outboard ends 44 and 42 and extends in a rearward direction of the vehicle 10. The mounting hook 32 includes an extension portion 48 and a hooking flange 50 that extends from the extension portion 48. As further shown, an end flange 52 extends downward from an upper portion of the fender body panel 18. Specifically, the end flange 52 extends from an inner surface 54 at a front edge 56 of the fender body panel 18. The end flange 52 in this example is integrally formed with the fender body panel 18. However, the end flange 52 can instead be coupled to the fender body panel 18 by screws, bolts, rivets, welds or by any other suitable type of fastener. The end flange 52 also defines at least one catch aperture 58 through which the mounting hook 32 is configured to extend when the lamp assembly 14 is coupled to the fender assembly 16. Furthermore, the mounting hook 32 extends in a longitudinal direction of the vehicle 10 and is configured to contact the peripheral edge portion 60 of the catch aperture 58 in the event that the lamp assembly 14 rotates about at least one of the fender projection 34 and the retaining structure 80 (i.e., rotates forward out of an installed position), thus assisting in retaining the lamp assembly 14 to the fender assembly 16.

As further illustrated, the fender projection 34 extends away from the main body 30 of the lamp assembly 14 in a rearward direction of the vehicle 10. The fender assembly 16 also includes a bracket 62 that extends away from the fender body panel 18 in an inboard direction of the vehicle 10. The bracket 62 can be secured to the fender body panel 18 using screws, bolts, rivets, welds or by any other suitable type of fastener, or can be integrally formed with the fender body panel 18. The bracket 62 further defines at least one mounting aperture 64 therein. Thus, the fender projection 34 is configured to extend into the mounting aperture 64 and engage a peripheral edge portion 66 of the mounting aperture 64 to laterally position the lamp assembly 14 with respect to the fender assembly 16. The fender projection 34 thus assists in retaining the lamp assembly 14 to the fender assembly 16.

As further shown, the side projection 36 extends from a lower portion 68 of the lamp assembly 14 in an outboard direction of the vehicle 10. Also, the fender body panel 18 includes a lower portion 70 defining a notch 72 that extends in a longitudinal direction L of the vehicle 10 and opens in a forward direction of the vehicle 10. The lower portion 70 can be secured to the fender body panel 18 using screws, bolts, rivets, welds or by any other suitable type of fastener, or can be integrally formed with the fender body panel 18. The notch 72 tapers from a widened portion 74 to a narrowed portion 76 that is spaced inward from the widened portion 74. Hence, the side projection 36 is received within the notch 72 and engages a peripheral edge portion 78 of the lower portion 70 defining the notch 72 when the lamp assembly 14 is coupled to the fender assembly 16. Thus, the engagement of the side projection 36 with the peripheral edge portion 78 of the lower portion 70 defining the notch 72 assists in retaining the lamp assembly 14 to the fender assembly 16. The side projection 36 is also configured to restrict rotational movement of the lamp assembly 14 about at least one of the fender projection 34 and the retaining structure 80.

In addition, the projection arrangement is further configured to engage the front end module 22 during installation of the lamp assembly 14 in order to retain the lamp assembly 14 in a self-supported position. That is, the retaining structure 80 discussed above is located at the inboard 44 end of the main body 30 of the lamp assembly 14 and extends away from the main body 30. The retaining structure 80 includes a mounting flange 84 and a mounting projection 38 (or second projection). The mounting projection 38 extends from an underside surface 82 of the mounting flange 84.

The mounting projection 38 is configured to contact a mounting member 86 of the bumper fascia retainer 28 when the lamp assembly 14 is installed to the vehicle 10. Specifically, an upper portion 88 of the mounting member 86 defines at least one aperture 90 therethrough. Thus, the mounting projection 38 is configured to extend into the aperture 90 when the mounting flange 84 of the retaining structure 80 rests on a contact surface 92 of the upper portion 88. The engagement of the mounting projection 38 with a peripheral edge 94 of the aperture 90 restricts movement of the lamp assembly 14 in the longitudinal direction L of the vehicle 10 and in the widthwise direction W (see FIG. 16) of the vehicle 10. The mounting projection 38 thus assists in retaining the lamp assembly 14 to the vehicle 10. Thus, in general terms, the mounting projection 38 (or second projection) contacts the peripheral edge 94 of the aperture 90, which faces away from an exterior surface of the main body 30 (the exterior vehicle lamp housing) such that the fender projection 34 and the mounting projection 38 (or first and second projections, respectively) maintain the lamp assembly 14 in a cantilevered self-supported position when the lamp assembly 14 is installed to both the fender assembly 16 and the bumper fascia retainer 28.

Figure 21:
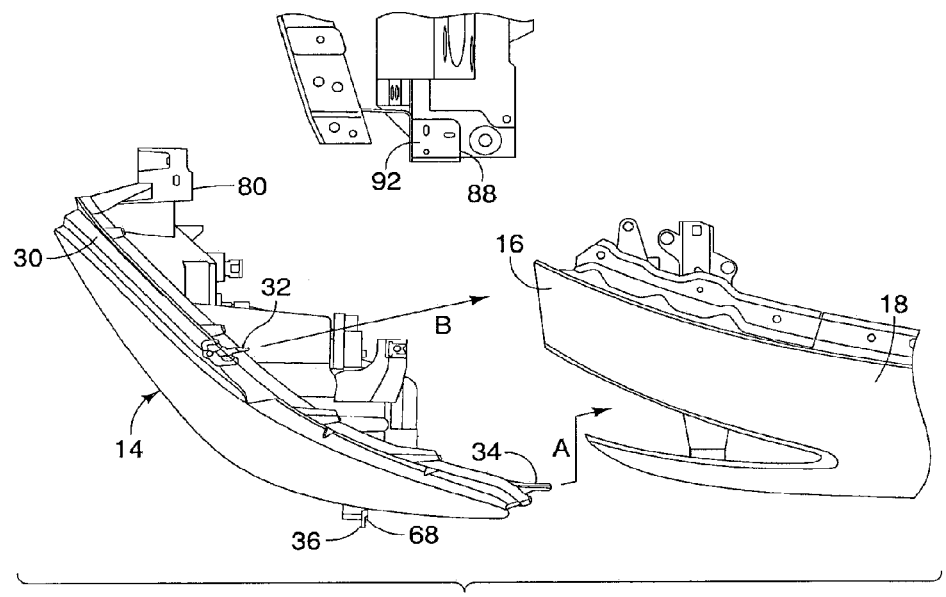
FIG. 21 is an exploded plan view illustrating an exemplary installation procedure for coupling the vehicle lamp assembly to the fender assembly and the front end module.
Figure 22:
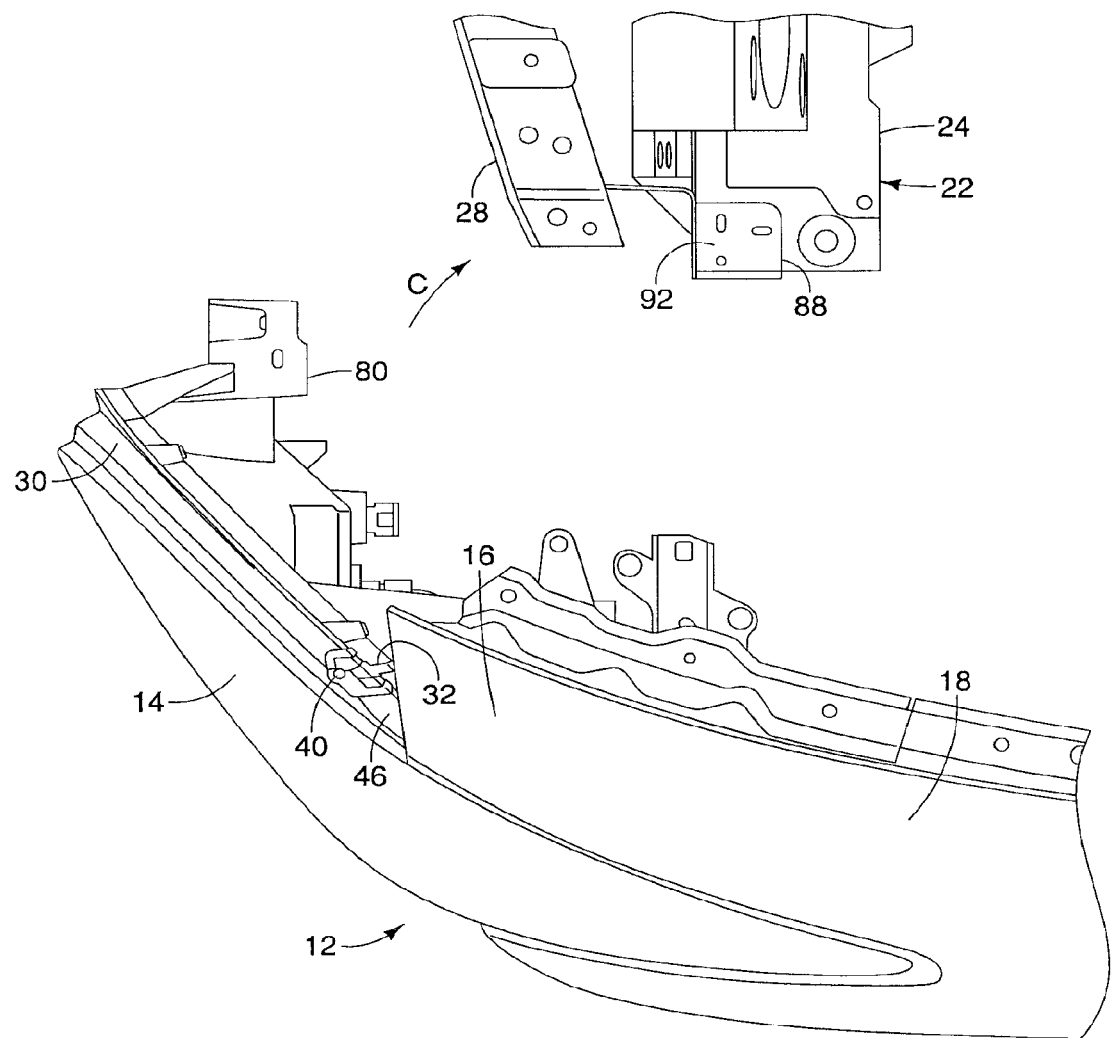
FIG. 22 is another exploded plan view further illustrating the exemplary installation procedure after the vehicle lamp assembly engages the fender assembly.

An example of a process for installing the lamp assembly 14 to the vehicle 10 will now be described with reference to FIGS. 21 and 22. As shown in FIG. 21, while the lamp assembly 14 is being installed to the vehicle 10, the lamp assembly 14 engages the fender assembly 16 in the direction of arrows A and B. Accordingly, the mounting hook 32, the fender projection 34, and the side projection 36 locate the lamp assembly 14 in a prescribed position and orientation with respect to the fender assembly 16 while assisting to support the lamp assembly 14 as discussed above.

As can be appreciated in the art, the fender body panel 18 can exhibit some inherent flexure properties and thus can be located (or anchored) into a final position with the lamp assembly 14 to a certain degree when the lamp assembly 14 is moved into engagement with the front end module 22. Therefore, as shown in FIG. 22, the retaining structure 80 is configured to engage the front end module 22 when the fender body panel 18 is urged with the lamp assembly 14 in a direction of arrow C from a rest position where the retaining structure 80 is spaced apart from the bumper fascia retainer 28 to an installed position where the mounting projection 84 of the retaining structure 80 contacts the bumper fascia retainer 28 to retain the fender body panel 18 in the installed position. Thus, contact between the mounting projection 38 and the peripheral edge 94 of the opening 90 helps to retain the lamp assembly 14 coupled to the front end module 22 and the fender assembly 16. In other words, the fender projection 34, the side projection 36 and the mounting projection 38 cooperate to retain the lamp assembly 14 in a cantilevered self-supported position relative to the fender assembly 16 and the front end module 22.

In addition, the fender body panel 18 includes at least one lamp attachment member 96, and the main body 30 of the lamp assembly 14 includes at least one fender attachment member 98. The fender attachment member 98 is configured to fixedly secure the lamp assembly 14 to the fender assembly 16 while the projection arrangement retains the lamp assembly 14 in the self-supported position. At least one fastener 100 is configured to fasten the lamp attachment member 96 to the fender attachment member 98. The fastener 100 can be a bolt, screw or any other suitable type of fastener.

As can be appreciated from the above, the vehicle lamp mounting assembly 12 increases the ease of installation by avoiding the necessity of a lift-assist mechanism during installation of the lamp assembly 14. The vehicle lamp mounting assembly 12 also improves fit-and-finish since only minimal gaps as necessary are maintained between the lamp assembly 14 and the fender assembly 16. Moreover, the vehicle lamp mounting assembly 12 enhances the overall structural rigidity of the front end of the vehicle 10.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "outboard", "inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An exterior vehicle lamp housing comprising:
a main body of the exterior vehicle lamp housing having an inboard end and an outboard end that are laterally spaced apart from one another;
a first projection that extends away from the outboard end of the main body and that is configured to be received in a mounting aperture defined by a body panel such that the first projection engages a peripheral edge of the mounting aperture; and
a retaining structure formed at the inboard end of the main body, the retaining structure including a mounting flange that extends away from the main body and a second projection that extends away from an underside of the mounting flange, with the second projection being configured to contact a mounting surface defined by a bumper fascia retainer that is laterally spaced apart from the body panel and with the mounting surface facing away from the exterior vehicle lamp housing such that the first and second projections maintain the exterior vehicle lamp housing in a cantilevered self-supported position when the exterior vehicle lamp housing is installed to both the body panel and the bumper fascia retainer.

2. The exterior vehicle lamp housing according to claim 1, wherein
the first projection is configured as a rear projection that extends away from the main body in a longitudinal direction of a vehicle including the exterior lamp housing and the body panel.

3. The exterior vehicle lamp housing according to claim 1, further comprising
a third projection that extends away from the outboard end of the housing in a first direction that is substantially perpendicular to a second direction in which the first projection extends, the third projection being configured to be received within a notch formed in the body panel such that contact between the third projection and a peripheral edge of the notch restricts rotational movement of the main body about at least one of the first and second projections.

4. The exterior vehicle lamp housing according to claim 1, further comprising
a fender attachment member that is spaced apart from the first and second projections and configured to fixedly secure the exterior vehicle lamp housing to the body panel.

5. The exterior vehicle lamp housing assembly according to claim 4, wherein
the fender attachment member is configured to receive a fastener that fastens the fender attachment member to the body panel.

6. The exterior vehicle lamp housing assembly according to claim 1, wherein
at least one of the first and second projections is integrally formed with the main body.

7. A vehicle comprising:
a body panel;
a bumper fascia retainer laterally spaced apart from the body panel; and
an exterior vehicle lamp assembly including a housing that includes
a main body having an inboard end and an outboard end that are laterally spaced apart from one another;
a first projection that extends away from the outboard end of the main body and that is configured to be received in a mounting aperture defined by the body panel such that the first projection engages a peripheral edge of the mounting aperture; and
a retaining structure formed at the inboard end of the main body, the retaining structure including a mounting flange that extends away from the main body and a second projection that extends away from an underside of the mounting flange, with the second projection being configured to contact a mounting surface defined by the bumper fascia retainer and with the mounting surface facing away from the exterior vehicle lamp assembly such that the first and second projections maintain the exterior vehicle lamp assembly in a cantilevered self-supported position when the exterior vehicle lamp assembly is installed to both the body panel and the bumper fascia retainer.

8. The vehicle according to claim 7, wherein
the body panel is configured to be flexed from a rest position where the first projection engages the peripheral edge of the mounting aperture defined by the body panel and the second projection is spaced apart from the bumper fascia retainer to an installed position where the second projection contacts the mounting surface defined by the bumper fascia retainer to retain the body panel in the installed position.

9. The vehicle according to claim 7, wherein
the mounting surface of the bumper fascia retainer at least partially defines a peripheral edge of a retainer aperture formed through the bumper fascia retainer, with the second projection being received in the bracket aperture when the exterior vehicle lamp assembly is installed to the bumper fascia retainer.

10. The vehicle according to claim 7, wherein
a third projection extends away from the outboard end of the housing in a first direction that is substantially perpendicular to a second direction in which the first projection extends, the third projection being configured to be received within a notch formed in the body panel such that contact between the third projection and a peripheral edge of the notch restricts rotational movement of the exterior vehicle lamp assembly about at least one of the first and second projections.

11. The vehicle according to claim 10, wherein
the notch tapers from a widened portion to a narrowed portion that is spaced inward from the widened portion.

12. The vehicle according to claim 7, wherein
the first projection is configured as a rear projection that extends away from the main body in a longitudinal direction of the vehicle.

13. The vehicle according to claim 7, wherein
the body panel defines an end flange that extends downward from an upper portion of the body panel and a catch aperture that passes through the end flange; and
the exterior vehicle lamp assembly further includes a lens coupled to the housing and a mounting hook fixed to an upper portion of the lens, with the mounting hook extending in a longitudinal direction of the vehicle and being received in the catch aperture when the exterior vehicle lamp assembly is installed to the body panel, and with the mounting hook being configured to contact a peripheral edge of the catch aperture when the exterior vehicle lamp assembly rotates about at least one of the first and second projections.

14. The vehicle according to claim 13, wherein
the mounting hook includes an extension portion and a hooking flange that extends away from the extension portion, the hooking flange being configured to contact an inner surface of the end flange to restrict movement of the exterior vehicle lamp assembly relative to the body panel in the longitudinal direction of the vehicle.

15. The vehicle according to claim 7, wherein
the housing of the exterior vehicle lamp assembly further includes a fender attachment member that is spaced apart from the first and second projections and configured to fixedly secure the exterior vehicle lamp assembly to the body panel.

16. The vehicle according to claim 15, wherein
the fender attachment member is configured to receive a fastener that fastens the fender attachment member to the body panel.

17. The vehicle according to claim 7, wherein
at least one of the first and second projections is integrally formed with the main body of the housing.

18. The vehicle according to claim 7, wherein
the body panel is a front fender panel of the vehicle.

19. The vehicle according to claim 7, further comprising
a front end module that is laterally spaced apart from the body panel; and
a front bumper fascia that at least partially surrounds the exterior vehicle lamp assembly, with the bumper fascia retainer being coupled to the front end module and being configured to support the front bumper fascia.

20. The vehicle according to claim 13, wherein
the mounting hook is replaceably coupled to the lens of the exterior vehicle lamp assembly in a reinstallable manner.

* * * * *